Aug. 6, 1929.　　　A. H. HANNON　　　1,723,480
ELECTROPLATING MACHINE
Filed March 31, 1927
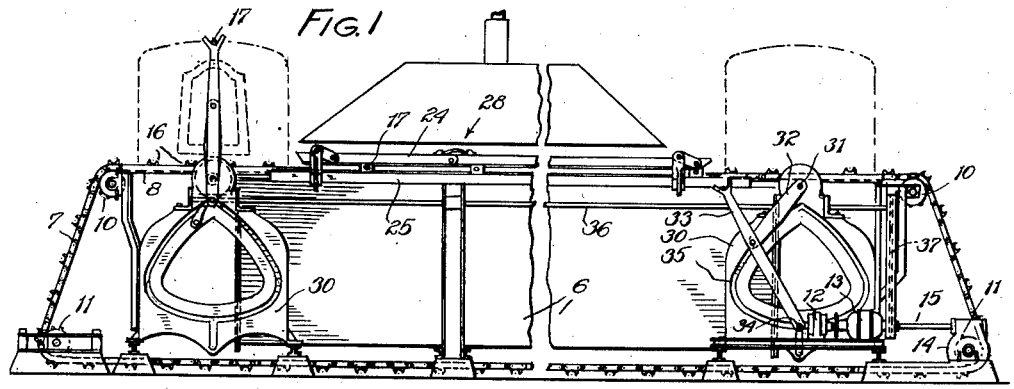
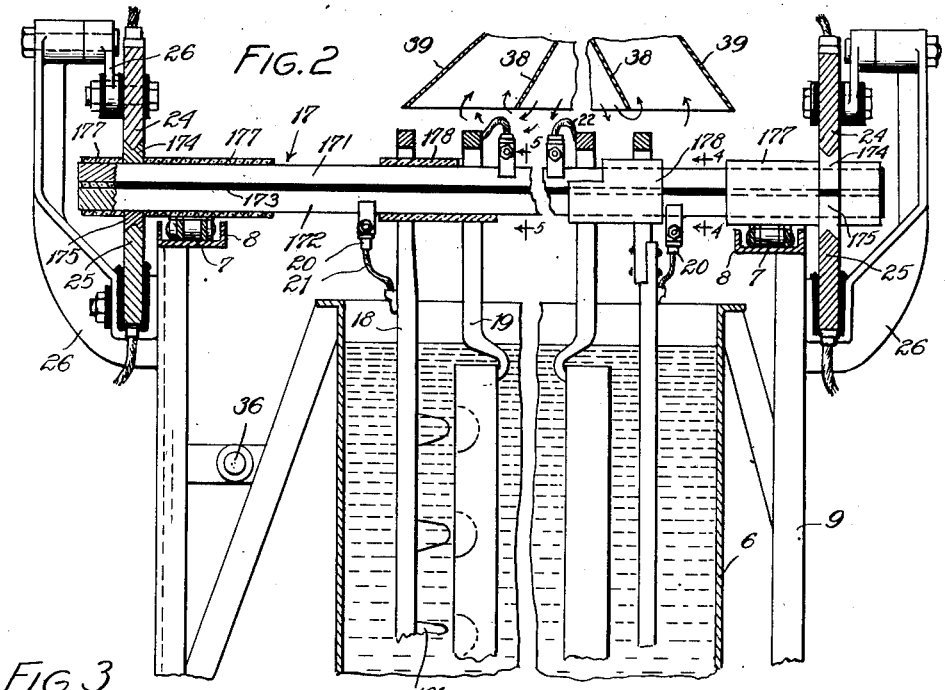
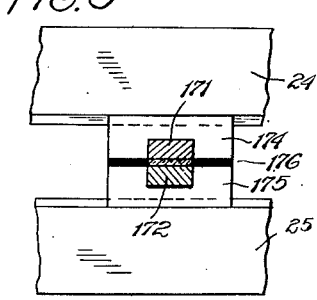
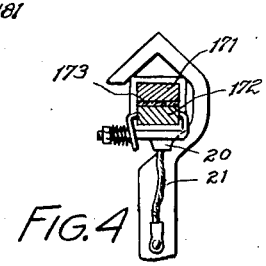
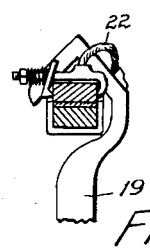
Inventor
Albert H. Hannon
John E. Titus
Atty Patented Aug. 6, 1929.

1,723,480

UNITED STATES PATENT OFFICE.

ALBERT H. HANNON, OF CHICAGO, ILLINOIS.

ELECTROPLATING MACHINE.

Application filed March 31, 1927. Serial No. 179,978.

This invention relates to improvements in electroplating machines where the work to be plated is carried through a series of solution tanks including an electroplating tank, by an automatic conveyor; and the invention is more particularly characterized by the provision of means whereby the plating electrode may be conveyed along together with the work.

Heretofore in automatic machines the electrodes have been supported in stationary positions along the sides of the tank, usually on a continuous pipe or support mounted on the wall of the tank, with the electrical current connection made at one portion of the support. Since the plating voltages are quite low, a small amount of resistance causes a considerable drop in potential between the electrodes which are on a path of low resistance to the current connection, and those to which the resistance is higher; and it is also obvious the distance between the work and the electrodes is constantly changing where the electrodes are stationary in the tank.

In certain classes of plating a slight variation in potential affects the color of the plate; accordingly it is desirable to maintain the voltage uniform. Also where the throwing power of the current is low, the electrodes must be grouped or arranged to accommodate the work in such manner that the whole surface of the piece being plated, especially the recessed surfaces, are subjected to the same current action, with a high density of current.

Therefore, the main objects of this invention are to provide an automatic machine in which the proper grouping may be accomplished and current densities maintained by moving the electrode through the machine along with the work so that the electrode will remain in a fixed relation with the work; to provide a carrying member to which the work and the electrode may be attached for being carried through the tanks, and maintained throughout at the proper differences in potential; to provide such a carrying member whereby the sliding contacts are made outside of the tank, and not over the solution, so that the contacting surfaces will not become corroded, coated with the plate from spattering, nor otherwise damaged as by the fumes from the electrolytic action; to provide a work support having relatively insulated portions which may be slidably contacted by bus bars of different potentials located beyond the edges of the tank, with the work and the electrode both hung on the support and connected through the support to the relative bus bar; to shorten the connection from the current supporting member to the electrodes, and reduce the resistance to increase the efficiency of the machine; to provide such a machine in which hoods may be placed over the tanks to remove the fumes; to provide a machine in which low efficiencies and localized action of the current are avoided; and to provide means for moving the electrodes through the machine along with the work so that the electrodes may be automatically cleaned with the work, and so that they may be frequently inspected and new ones supplied when required, without requiring any especial attention of the operator, or interference with the operation of the machine.

An electroplating machine embodying my invention is shown in the accompanying drawings, in which:

Fig. 1 is a side elevation of the machine with portions broken out.

Fig. 2 is a fragmental cross section through the electroplating tank, showing the upper portions of the tank, with the center broken out.

Fig. 3 is a detail view of the contact shoes showing fragments of the bus bars, and showing the work support rod in section.

Fig. 4 is a section taken on line 4—4 of Fig. 2.

Fig. 5 is a section taken on line 5—5 of Fig. 2.

In the embodiment of this invention shown, bus bars of opposite polarity are mounted along the sides of the plating tank, and both the electrode and the work to be plated are hung on the same support rod, which is carried over the top of the tank by means of chain conveyors. The support rods of course extend across the tank, and are provided with shoes at the ends, with which the bus bars slidably engage as the bars pass along the tank. The insulated shoes in contact with the opposite bus bars are connected to the work and the electrode respectively, preferably by insulating portions of the support rods and provide the proper electrical connections through said portions to the electrode and the work to maintain the differences of polarity required.

In this manner the electrode and the work, which may be supported on a suitable work rack or other form of carrier, may be attached to the support rod at the loading end of the machine in the desired relation, and will be carried through the machine from one tank to the next without any change in relative positions, and delivered to the unloading end of the machine, when the work may be removed and the rack and electrode returned to the loading end.

Where a great number of pieces are to be plated, the proper adjustments and arrangements, such as the electrode grouping, the timing, the strength of the solution, the voltage differences, and other essential matters, may be determined for one lot of work. Then the remaining work will undergo precisely the same conditions and the plating will be uniform throughout, with very little attention required of the operator.

Uniform current densities, which are more especially required in chromium plating, may be had, since the relation of the electrode to the work may be properly determined, and the electrical connections to the bus bars remain uniform over short current paths.

Arranging the bus bars at the sides also enables hooding the plating tank to carry off the fumes, and to protect the sliding electrical connections from the spattering of the solution or corrosive action of the gases in the fumes.

Referring to the drawings, only the one electro-plating tank 6 is shown in Fig. 1, but it is to be understood that there are to be several solutions, washing, rinsing tanks, and the like, both between the loading end of the conveyor, shown at the left, and the unloading end, shown at the right. The tanks are spaced from the floor, or placed over a pit, and the conveyor chains 7 travel to the left over the tops of the tanks and return underneath. Two chains are provided which slide in suitable channels 8, mounted on the frame structures 9, at either side of the machine.

At the ends, the chains 7 run over the upper sprockets 10, and the lower sprockets 11, the lower sprockets being positioned outwardly so that the end flights of the chains are inclined for convenience in loading and unloading. The lower sprocket at the right is driven from the motor 12, through the speed reduction unit 13 and the worm drive 14, which are connected by the shaft 15.

The chains 7 are provided at regular intervals, with upstanding recessed plates 16, into which the ends of the support members 17 are laid for being carried through the machine. Preferably the members 17 are built up of two bars, 171 and 172, separated by the strip of insulation 173 which lies between the bars throughout the length. At either end contact shoes 174 and 175 are secured to the bars 171 and 172 respectively, and are insulated by the strips 176.

Sleeves 177, of insulating material, are placed at the ends of the bars 171 and 172, on either side of the contact shoes, to bind the bars together and to prevent stray currents from leaking into the frame portions of the machine, and to insulate the bars from the conveyor chains 7 and the channel members 8.

Additional sleeves 178 may be provided along the bars for insulating the electrodes 18 and the work carriers 19. The electrodes 18 are hooked over the sleeves 178, and connected to the lower bar 172 by the spring clip connectors 20 which are permanently connected to the electrodes by flexible cables 21. The upper portions of the sleeves 178 are cut away so that the work carrier may be hooked directly to the upper bar 171 and prevented from contacting with the lower bar 172, an additional connection being provided by the cable connector 22 to insure good electric contact.

Pairs of bus bars, 24 and 25, of opposite polarity, are insulatingly mounted on either side of the tank, in the brackets 26 which may be attached to the lower sides of the channels 8. The bus bars are positioned so that the shoe 175 rides on the lower bus bar 25, which is rigidly supported on the brackets 26. The upper bus bars 24 are carried by links 27 which are pivotally attached to the brackets 26, so that the bars rest on the upper shoes 174 with an even, firm pressure. The ends of the upper bus bars are beveled so that the shoes may move under and raise the bars, and the bars are jointed as at 28 so that not more than two bars are under one section at a time, and the bus bar will contact with all of the shoes.

At the ends of each tank, are provided transfers having the frames 30, which are supported from the floor. These transfers are timed to lift the support rods 17 off the chains, as the rods move toward the end of a tank, swing them over, and lower them back onto the chain over the next tank, or beyond the end wall of the tank as the case may be, so that the work is lifted out of one tank and transferred to the next tank, enabling the carrier chain to move continuously in a straight path. The transfers comprise a shaft 31 which is journaled in the frames 30, which are arranged in pairs on the opposite sides of the machine, the crank arms 32 keyed to the ends of the shaft, and the lifting arms 33 which are centrally pivoted to the outer end of the crank arm, and which are provided with cam rollers 34, which ride in the cam groove 35, formed in the lower portion of the frame member 30. The form of the cam groove is such that the lower end of the arm 33 is oscillated as the arm is carried around by the crank, that the upper end of the arm crosses the path of the chain to engage the outer ends of the support rods 17, moves vertically upward, swings over, then moves straight down to return the member 17 to the chain, and then swings back to lift the next support member. This mechanism is more fully illustrated and described in my application, Serial Number 14,578, filed November 15, 1926.

The transfer shafts 31 are driven by a shaft 36 which extends along one side of the machine, and is connected to the transmission shaft by means of a chain drive 37, with a suitable timing relation to synchronize the action of the transfer to the movement of the chain plates 16. After a support rod 17 is deposited on the chain at the front end of the plating tank, it is carried between the upper and lower bars, 24 and 25; and moves out from under the upper bus bar before being engaged by the lifting arm of the next transfer at the rear end of the tank.

In the machine shown it is apparent that obstructions over the top of the tanks are eliminated, and it becomes possible to hood the tank to carry away the fumes. Preferably a composite hood structure is provided, having an inner hood 38 for the down-draft, and an outer hood 39 surrounding the inner hood for the up-draft, as is indicated in Fig. 2. This will cause a circulation of air over the top of the solution in the tank, and will draw the air back upwardly at the sides to prevent the fumes from escaping.

In operation, the support rods 17 are returned to the front end of the machine after having passed through the machine, either by separate conveyor, or by holding the rods up against the inverted plates 16 in the lower flight of the conveyor by means of suitable guides. The attendant hangs the work and the electrodes on the rods as they are moving upwardly. In some cases special forms of electrodes may be required as indicated at the left side in Fig. 2, where projections are indicated on the electrode registering with recesses indicated in dotted line in the work which is hanging on the carrier 19. Or the electrode may be of some special form and size, or a group of electrodes may be required, as for small pieces hung on racks, in order to distribute the flow of the current, when the parts are in the plating tank solution, evenly over the surface of pieces being plated, with high and uniform current densities, thus obtaining all of the advantages of the hand operated plating apparatus, with an enormous increase in output.

After the support moves over the upper sprocket, it is engaged by the transfer arm, and the work and electrodes suspended from the support are lifted into the tank. In the plating tank, the contact shoes are engaged by the bus bars to maintain the two elements at differences in polarity to cause the plating action. The plating may be carried over from the electrode, as in nickel plating and the like, or the metal may be taken from the solution, as in chromium plating, or deposited in any manner which may be characteristic of the particular form of plating being used.

At the end of the plating tank, the electrodes and the work are lifted out, carried through the remaining tanks, and finally conveyed to the unloading station at the left in Fig. 1, where the attendant at that station may remove the work, and either leave the electrodes on the rods where the rods are carried back by the chains or place the rods and the electrodes in suitable return conveyors for transportation back to the loading end for being used with new work.

Having thus described my invention, my claims are:

1. The combination in an electroplating machine, of a solution tank, conveyor chains extending along the sides of the tank, a work support bar resting across the chains, a work holder and an electrode hooked on the bar, and slidably connected means for maintaining the holder and the electrode at relatively different electrical potentials.

2. The combination in an electroplating machine, of a solution tank, a conveyor chain movably supported at each side of the tank, a work support resting across the chains, the support consisting of two metal bars secured together and insulated from each other, a positive and a negative bus bar mounted along the side of the tank, contact shoes for connecting the work support bars respectively to the bus bars, a work support rack and an electrode hooked on the work support, the rack being connected to one and the electrode to the other of the work support bars, so that the rack and the electrode are maintained at different polarities.

3. In an electroplating machine, a tank, conveyor chains extending along the side edges of the tank, a work support resting across the chains consisting of two bars secured together one above the other and insulated from each other and from the chains, an electrode, a work rack, said electrode and work rack having hooked ends, an insulating sleeve enclosing a portion of the bars, the work rack being hooked over a bare portion of the upper bar in electrical contact therewith, the electrode being hooked over said sleeve, means for electrically connecting the electrode to the lower bar, and means for maintaining the bars at different electrical potentials.

ALBERT H. HANNON.